United States Patent
Isobe et al.

(10) Patent No.: US 8,312,521 B2
(45) Date of Patent: Nov. 13, 2012

(54) BIOMETRIC AUTHENTICATON SYSTEM AND METHOD WITH VULNERABILITY VERIFICATION

(75) Inventors: Yoshiaki Isobe, Kawasaki (JP); Masahiro Mimura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 856 days.

(21) Appl. No.: 12/293,470

(22) PCT Filed: Mar. 23, 2007

(86) PCT No.: PCT/JP2007/055960
§ 371 (c)(1), (2), (4) Date: May 11, 2009

(87) PCT Pub. No.: WO2007/111234
PCT Pub. Date: Oct. 4, 2007

(65) Prior Publication Data
US 2009/0307764 A1 Dec. 10, 2009

(30) Foreign Application Priority Data
Mar. 24, 2006 (JP) ................................. 2006-082596

(51) Int. Cl.
*H04L 29/00* (2006.01)
(52) U.S. Cl. .................................. 726/7; 726/20; 726/25
(58) Field of Classification Search .................. 726/7, 25
See application file for complete search history.

(56) References Cited

U.S. PATENT DOCUMENTS

| | | | |
|---|---|---|---|
| 7,237,264 B1 * | 6/2007 | Graham et al. ................. | 726/23 |
| 2004/0002894 A1 * | 1/2004 | Kocher ........................... | 705/13 |
| 2006/0031938 A1 * | 2/2006 | Choi .............................. | 726/25 |

FOREIGN PATENT DOCUMENTS

| | | |
|---|---|---|
| JP | 2000-215280 | 8/2000 |
| JP | 2003-143136 | 5/2003 |
| JP | 2003-215280 | 7/2003 |
| JP | 2003-224562 | 8/2003 |
| JP | 2003-256360 | 9/2003 |
| JP | 2003-256376 | 9/2003 |
| JP | 2003-318892 | 11/2003 |
| JP | 2004-348308 | 12/2004 |
| JP | 2005-109716 | 4/2005 |

(Continued)

OTHER PUBLICATIONS

Nikkei Byte, Apr. 2005 issue, pp. 60-67, "Wet Finger and Dry Finger—Practice of First Fingerprint Authentication" (cited in the specification).

(Continued)

*Primary Examiner* — Brandon Hoffman
*Assistant Examiner* — Helai Salehi
(74) *Attorney, Agent, or Firm* — Antonelli, Terry, Stout & Kraus, LLP.

(57) ABSTRACT

A biometric authentication device has a threat of an attack of pretending to be someone else by such as forgery. The present invention supports a service provider to appropriately decide the level of such threat.

A vulnerability verification server 150 is provided in the system, and the vulnerability of each biometric product is centrally managed. A service provider 130 sends the information that specifies the device in which a client terminal 110 executes the biometric authentication to the vulnerability verification server 150, and receives the vulnerability information. The service provider 130 decides whether the service can be provided or not to the client terminal 110 using the vulnerability information that was received.

13 Claims, 8 Drawing Sheets

FOREIGN PATENT DOCUMENTS

JP         2007-257428         10/2007

OTHER PUBLICATIONS

Financial Services Agency, The Japanese Government, Ninth Study Guide Group Relating to Forged Cash Card, Apr. 15, 2005, "About Biometric Authentication in Financial Trading" [search on Feb. 6, 2006], Internet URL http://www.fsa.go.jp/singi/singi_fccsg/gaiyou/f-20050415-singi_fccsg/02.gdf (cited in spec.).

The Institute of Electronics, Information, and Communication Engineers (IEICE), Ubiquitous Network, Biometric Security in Society, Proceedings of First Study Presentation of Study Group, Jul. 22 and 23, 2003, pp. 43-47, "Analysis Related Threat and Vulnerability in Biometric Authentication" (cited in spec.).

\* cited by examiner

FIG. 3

| ITEM NUMBER | ITEM | CONTENT |
|---|---|---|
| 510 | DEVICE ID | INFORMATION THAT UNIQUELY SPECIFIES A BIOMETRIC AUTHENTICATION DEVICE |
| 520 | DEVICE SPECIFICATION ID | INFORMATION THAT UNIQUELY SPECIFIES A SPECIFICATION OF A BIOMETRIC AUTHENTICATION DEVICE |
| 530 | SOFTWARE VERSION | INFORMATION THAT UNIQUELY SPECIFIES A VERSION OF THE DRIVER SOFTWARE OF A BIOMETRIC AUTHENTICATION DEVICE |
| 540 | CONDITION OF USE | WHETHER THE USE OF THE DEVICE IS CARRIED OUT UNDER CONTROL OR NOT |
| 550 | TEMPLATE INFORMATION | INFORMATION OF THE COLLATED TEMPLATE (VERSION INFORMATION AND ID INFORMATION) |
| 560 | COLLATION RESULT | RESULT OF BIOMETRIC COLLATION (A SCORE OR OK/NG TO THE REQUEST ACCURACY OF THE SERVER) |
| 570 | SECURITY INFORMATION | INFORMATION FOR VERIFYING THE COMPLETENESS OF THE ABOVE-DESCRIBED INFORMATION (MAC, DIGITAL SIGNATURE) |

| DEVICE SPECIFICATION ID 210 | TYPES 220 | RANGE 230 | | | CONDITION OF USE (CONTROL) 240 | DIFFICULTY OF FRAUD AND FORGERY 250 | ATTACKER LEVEL 260 |
|---|---|---|---|---|---|---|---|
| | | DEVICE ID | SOFT VERSION | TempID | | | |
| COMPANY A- 001 | TAMPERING PROPERTY | — | — | — | NO CONTROL | GENERAL-PURPOSE PRODUCT AND CAPABLE OF FRAUD WITHOUT COOPERATION | NO NEED FOR SPECIAL KNOWLEDGE |
| COMPANY A- 002 | LEAKING OF THE CIPHER | #002-AAA | — | — | NO RELATION TO CONTROL | GENERAL-PURPOSE PRODUCT AND COOPERATION IS NECESSARY | A COLLEGE GRADUATION LEVEL |
| COMPANY A- 003 | GOAT | — | — | T003-A | NO CONTROL | CUSTOM-MADE PRODUCT AND CAPABLE OF FRAUD WITHOUT COOPERATION | A LEVEL OF SPECIALIST |
| COMPANY A- 004 | LEAKING OF THE TEMPLATE | #004-AAA | — | T004-A | NO CONTROL | CUSTOM-MADE PRODUCT AND COOPERATION IS NECESSARY | A LEVEL OF A DESIGNER OF THE DEVICE SPECIFICATION |
| COMPANY B- 001 | WOLF | — | — | — | NO RELATION TO CONTROL | CUSTOM-MADE PRODUCT AND COOPERATION IS NECESSARY | A LEVEL OF A DESIGNER OF THE DEVICE SPECIFICATION |
| COMPANY C- 001 | ACCEPTANCE OF FORGERY | — | — | — | NO CONTROL | GENERAL-PURPOSE PRODUCT AND CAPABLE OF FRAUD WITHOUT COOPERATION | NO NEED FOR SPECIAL KNOWLEDGE |
| COMPANY D- 001 | IMPERILING OF ENCRYPTION TECHNOLOGY | — | — | — | NO RELATION TO CONTROL | GENERAL-PURPOSE PRODUCT AND CAPABLE OF FRAUD WITHOUT COOPERATION | A COLLEGE GRADUATION LEVEL |

FIG. 5

| ITEM NUMBER | ITEM | | CONTENT |
|---|---|---|---|
| 310 | AUTHENTICATION ACCURACY | | ACCEPTANCE RATE OF A STRANGER THAT IS REQUIRED FOR AUTHENTICATION |
| 320 | VULNERABILITY LEVEL THAT CAN BE PERMITTED UNDER CONTROL | | VULNERABILITY LEVEL THAT CAN BE PERMITTED IN THE CASE OF USING UNDER CONTROL |
| | 321 | DIFFICULTY OF FRAUD AND FORGERY | THE VULNERABILITY IS EXPRESSED BY BOTH PARAMETERS OF THE DIFFICULTY OF FRAUD AND THE ATTACKER LEVEL |
| | 322 | ATTACKER LEVEL | |
| 330 | VULNERABILITY LEVEL THAT CAN BE PERMITTED UNDER NO CONTROL | | VULNERABILITY LEVEL THAT CAN BE PERMITTED IN THE CASE OF NOT USING UNDER CONTROL |
| | 331 | DIFFICULTY OF FRAUD AND FORGERY | VULNERABILITY IS EXPRESSED BY BOTH PARAMETERS OF THE DIFFICULTY OF FRAUD AND THE ATTACKER LEVEL |
| | 332 | ATTACKER LEVEL | |

140

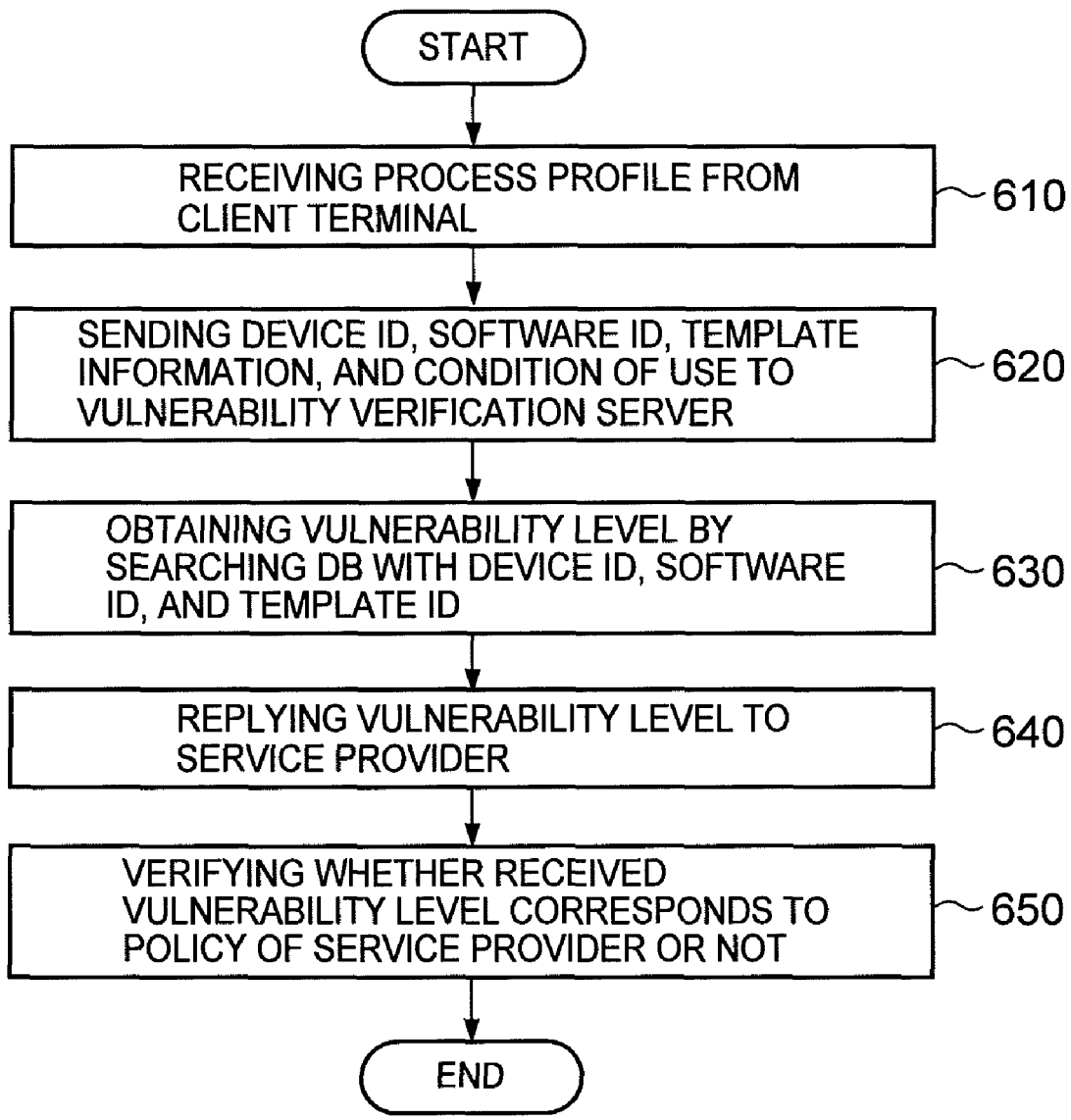

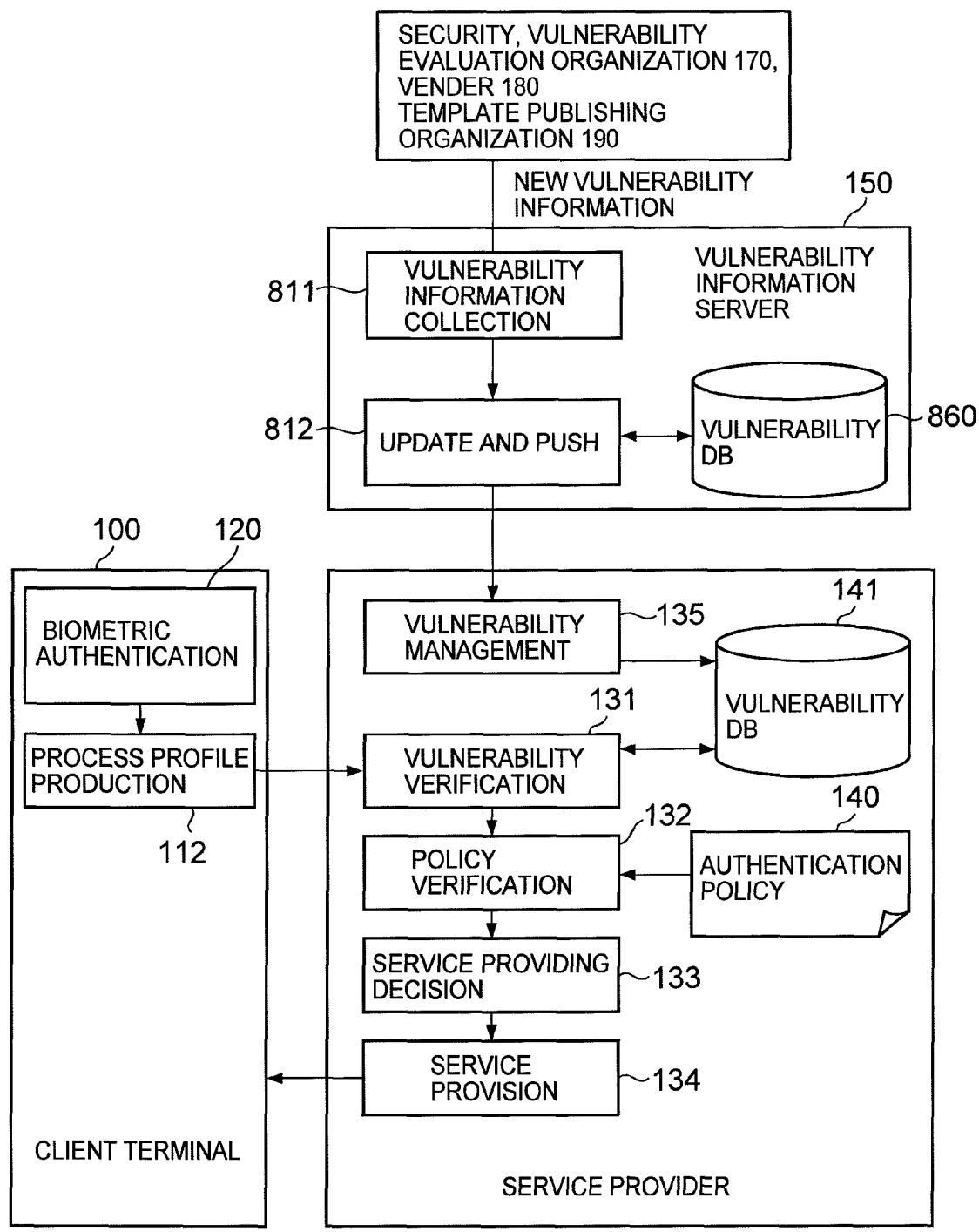

BIOMETRIC AUTHENTICATON SYSTEM AND METHOD WITH VULNERABILITY VERIFICATION

TECHNICAL FIELD

The invention relates to a system using biometric authentication for individual authentication through a network.

BACKGROUND ART

For individual authentication through a network, there is a system using biometric authentication.

For example, there is a system of performing individual authentication using public key information registered in an IC card and biometric information that is digitally signed in association with the information (for example, refer to Patent Document 1).

Further, there is an authentication server and device that performs the individual authentication in accordance with an application policy by selecting a biometric authentication technique that satisfies a safety level such as the acceptance rate of a stranger and the permissible risk that are requested by the application (for example, refer to Patent Document 2).

There is a system that performs the individual authentication by negotiating an authentication policy such as the acceptance rate of a stranger in which the application requires a client and a guarantee of a security level regulated in ISO15408 with an authentication model in accordance with a resource of the client and a privacy policy between the client and the application (for example, refer to Patent Document 3).

There is an identity verification system and device in which a biometric authentication process result that is carried out in an apparatus is digitally signed following a biometric authentication level required by the service using equipment certificates based on the public key information of the equipment connected to the client (for example, Patent Document 4).

There is an individual authentication system and program that decides an interruption of processing a statement of mutual agreement by informing the encrypted biometric information to the server during the agreement process of TLS (Transport Layer Security), decoding and performing biometric collation in the server(for example, refer to Patent Document 5).

Further, information of which a vulnerability problem related to the biometric authentication is evaluated and analyzed is opened to the public (for example, refer to Non-Patent Document 1, Non-Patent Document 2, and Non-Patent Document 3).

[Patent Document 1]Japanese Patent Application Kokai Publication No. 2000-215280

[Patent Document 2]Japanese Patent Application Kokai Publication No. 2003-256360

[Patent Document 3]Japanese Patent Application Kokai Publication No. 2004-348308

[Patent Document 4]Japanese Patent Application Kokai Publication No. 2003-143136

[Patent Document 5]Japanese Patent Application Kokai Publication No. 2003-224562

[Non-Patent Document 1]Nikkei Byte, April 2005 issue, pp 60-67, "Wet Finger and Dry Finger—Practice of First Fingerprint Authentication"

[Non-Patent Document 2]Financial Services Agency, The Japanese Government, Ninth Study Group Relating to Forged Cash Card, Apr. 15, 2005, "About Biometric Authentication in Financial Trading" [search on Feb. 6, 2006], Internet URL http://www.fsa.go.jp/singi/singi_fccsg/gaiyou/f-20050415-singi_fccsg/02. pdf

[Non-Patent Document 3]The Institute of Electronics, Information, and Communication Engineers (IEICE), Ubiquitous Network, Biometric Security in Society, Proceedings of First Study Presentation of Study Group, Jul. 22 and 23, 2003, pp 43-47, "Analysis Related Threat and Vulnerability in Biometric Authentication"

DISCLOSURE OF THE INVENTION

Problems to be Solved by the Invention

As described in Non-Patent Document 1, the threat of attacking that is due to pretending to be someone else such as forgery (hereinafter referred to as the threat of pretending to be someone else) cannot be denied in the individual authentication by the biometric authentication device. The biometric authentication device has a weak point in the threat of pretending to be someone else that differs with the characteristics of each device. Such weak point that is peculiar to the device is called vulnerability of the biometric authentication device. Points that are needed to be considered when investigating countermeasures for each vulnerability are categorized in Non-Patent Document 2.

However, the level and the range of the vulnerability differ depending on specifications of the hardware and the software of each biometric authentication device on whether there is a security countermeasure technique or not. Further, the level and the range differ depending on the level of the attacker.

Especially in a system in which a service is provided after the individual authentication is performed of a user that has an authority to receive it, the service provider side cannot appropriately decide the level of the threat of pretending to be someone else using the vulnerability that is peculiar to the biometric authentication device that performs the individual authentication in an environment where various types of and miscellaneous biometric authentication devices are everywhere.

The present invention was carried out in view of the above-described situation, and provides a system to support the service provider to appropriately decide the level of the threat of pretending to be someone else by an attacker to the individual biometric authentication that is carried out.

Means for Solving the Problems

In the individual authentication system with vulnerability verification in the present invention, a server is provided that executes the central management of the vulnerability information of each biometric authentication product, the service provider receives information from the client that specifies the device and the environment in which the biometric authentication is performed, and acquires the vulnerability information of the applicable device from the above-described vulnerability information that is centrally managed. The service provider decides whether the service can be provided or not using the acquired vulnerability information.

Specifically, the present invention provides a biometric authentication system that provides a service after carrying out personal identification of a service requester through a data communication network and that is equipped with a client terminal that receives an input of the biometric information of the service requester and performs a biometric authentication with its own biometric authentication means using the above-described biometric information that is received, a service provider that provides a service, and a vulnerability verification server that keeps the vulnerability information that is the information showing the level of vulnerability of the biometric authentication means that has a possibility of being connected to the above-described biometric authentication system, and is characterized in that the above-described vulnerability verification server is equipped with a vulnerability verification means that replies to the service provider that provides the above-described vulnerability information of the applicable biometric authentication means when receiving the provided information that specifies the biometric authentication means from the service provider, and that the above-described service provider is equipped with a service providing judgment means that decides whether the service can be provided or not to the above-described client terminal having the applicable biometric authentication means based on the above-described vulnerability information and a service providing means that provides a service to the client terminal where the request of the service is made in the case that the service providing judgment means decides it is possible.

Effect of the Invention

According to the present invention, it supports the service provider to appropriately decide the level of a threat of pretending to be someone else by an attacker to the individual biometric authentication that is carried out.

BRIEF DESCRIPTION OF THE DRAWINGS

FIG. 3 is a drawing showing one example of a process profile in the first embodiment.

FIG. 4 is a drawing showing one example of the vulnerability information that is kept in a vulnerability DB in the first embodiment.

FIG. 5 is a drawing showing one example of the authentication policy in the first embodiment.

FIG. 7 is a process flow of the vulnerability verification process in the first embodiment.

FIG. 8 is a functional configuration drawing of each device configuring the system in the second embodiment.

EXPLANATION OF THE REFERENCE NUMERALS

100: Data Communication Network, 110: Client Terminal, 112: Process profile producing function, 120: Biometric authentication Function, 130: Service Provider, 131: vulnerability verification function, 132: Policy verification function, 133: Service providing judgment function, 134: Service providing function, 140: verification policy, 150: vulnerability verification server, 151: vulnerability information collection function, 152: vulnerability verification function, 160: vulnerability information database, 170: vulnerability evaluation organization, 180: Biometric authentication product vender, and 190: template publishing organization.

BEST MODE FOR CARRYING OUT THE INVENTION

<<First Embodiment>>

Below, the embodiments in the present invention are explained using drawings.

Figure 1:
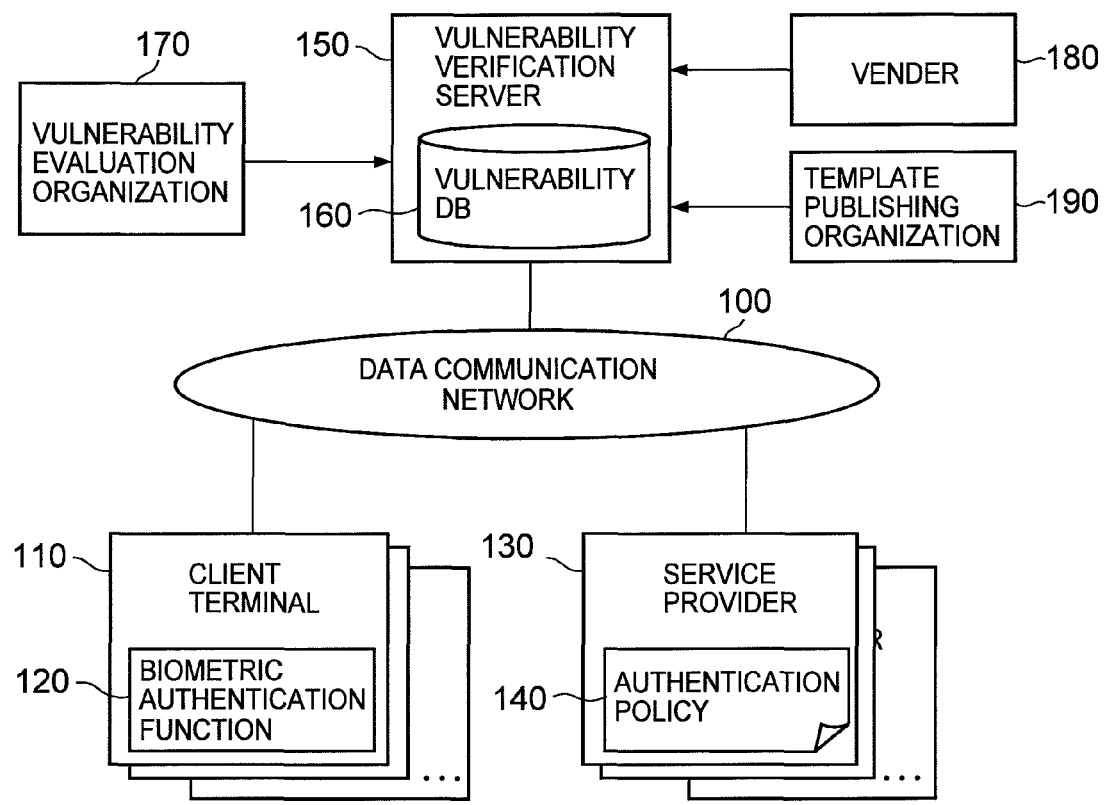
FIG. 1 is a system configuration drawing of the biometric authentication system with the vulnerability verification in the first embodiment.

FIG. 1 is a system configuration drawing of the biometric authentication system with the vulnerability verification function of the first embodiment applied in the present invention.

As shown in the present drawing, the biometric authentication system is equipped with a data communication network 100 such as an internet and a wireless communication network, a client terminal 110 having a biometric authentication function 120 that is connected to the data communication network 100, a service provider 130 that provides a service to a client following an authentication policy 140 determined in advance, and a vulnerability verification server 150 having a vulnerability database 160 of the vulnerability information with each specification of the biometric authentication. Moreover, the number of client terminals 110 and service providers 130 does not matter.

Figure 2:
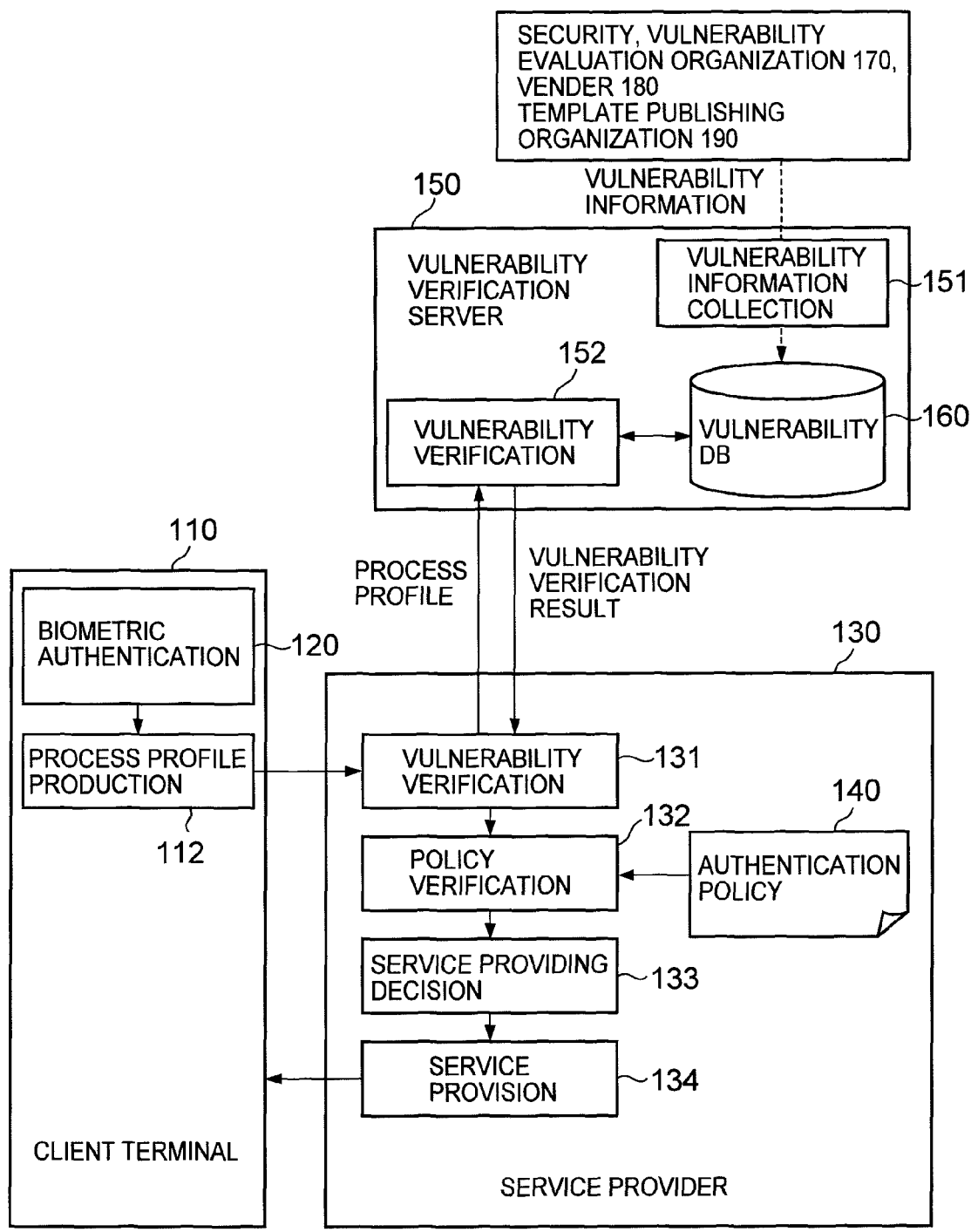
FIG. 2 is a functional configuration drawing of each device configuring the system in the first embodiment.

Next, each configuration is explained in detail. FIG. 2 is a functional configuration drawing of each of the client terminal 110, the service provider 130, and the vulnerability verification server 150 configuring the system in the present embodiment.

The client terminal 110 is equipped with a biometric authentication function 120 and a process profile production function 112.

The biometric authentication function 120 performs the individual authentication using the biometric information of the user when receiving a request of the individual authentication from the service provider 130, and gives its result to the process profile production function 112.

The process profile production function 112 produces a process profile 500 from the result of the individual authentication by the biometric authentication function 120 and the information that specifies a biometric authentication device (biometric authentication product) that realizes the above-described biometric authentication function 120, and sends it to the service provider 130 that requests the individual authentication. Moreover, in the case that the result of the individual authentication is authentication-failed here, the service request is withdrawn and the process is ended without producing the process profile 500.

One example of the process profile 500 produced here is shown in FIG. 3. As shown in the present drawing, in the process profile 500, a device ID (for example, a product number, a serial number of a public key certificate of the equipment, etc.; the type of the biometric can be decided by what this biometric authentication device collects) 510 that is ID information that uniquely designates the biometric authentication device, a device specification ID (for example, a model number) 520 that uniquely designates the specification of the biometric authentication device, a software version 530 that is a version of the software of the biometric authentication device, a condition of use 540 of the client terminal on whether it is used in control, for example, template information 550 that is the version and ID information of the template that is used in authentication, a collation result 560 that is the information showing the result of the biometric authentication executed at the client terminal 110 (in the present embodiment, the score of the acceptance rate of a stranger achieving the corresponding collation, or the information of OK showing the score is cleared, or of NG showing the score cannot be cleared in the case of receiving the score of the acceptance rate of a stranger that must be achieved from a service provider 130 during the authentication request), and security information 570 that is to verify that the information of these data 510 to 560 is not information that is altered (for example, MAC (Message Authentication Code), a digital signature, etc.). Moreover, it is desirable to standardize the condition of use and terms in the information stored as the condition of use 540 of the process profile 500 with those registered in a vulnerability database 160 described later.

A vulnerability server 150 is equipped with a vulnerability information collection function 151, a vulnerability verification function 152, and the vulnerability database (DB) 160.

The vulnerability information collection function 151 collects the vulnerability information from a vulnerability evaluation organization 170, a vender 180, and template publishing organization 190, and records it in the vulnerability DB 160.

The vulnerability DB 160 keeps the vulnerability information that specifies the vulnerability in every device specification of the biometric authentication device of each company (a biometric authentication product). One example of the vulnerability information that is kept in the vulnerability DB 160 is shown in FIG. 4. As shown in the present drawing, in the vulnerability information in the present embodiment, a type 220, a range 230, a condition of use 240, a difficulty of fraud and forgery 250, and a level of an attacker 260 are registered for every device specification ID 210.

As the device specification ID 210, a code that uniquely distinguishes the device specification of various biometric authentication device that can be used in the present system is registered such as a hardware model number of the authentication device loaded with the biometric authentication function and a version number of the software that realized the biometric authentication function.

The type 220 is a type of the vulnerability affecting the client terminal 110 that executes the biometric authentication, and for example the types categorized in Non-Patent Document 2 described above (for example, a wolf, a goat, acceptance of forgery, and acceptance of a stranger), etc. are registered. Further, besides the vulnerability related to biometrics, it may be configured to prepare and register also an attack that is utilizing the vulnerability as an IT product such as an anti-tampering property of the biometric authentication equipment, leaking of the cipher information and the template, and compromising a cipher technique as a category.

As the range 230, the range where the vulnerability affects is registered. Specifically, in the range 230, a device ID and a software version and template ID that are affected are registered. In the case that only the prescribed device ID is registered, it means that only the device ID registered is affected among the specifications designated in the device specification ID 210. If the device has the prescribed device ID, its software version and template ID are unnecessary. In the same way, also in the case that only the software version and template ID is registered, it means that only the device using the software version, or template ID specified by the registered items is affected regardless of other items besides the registered items in the device with a specification designated by the device specification ID 210.

For example, in the case that the device specification ID 210 in FIG. 4 is a biometric authentication device of company A-001, any items of the range 230 are not registered. In this case, it means that the entire product company A-001 of the specification designated by the device specification ID 210 is affected. Further, in the case that the device specification ID 210 is a device of company A-002, only the device ID is registered. In this case, only the device using the registered device ID is affected. Furthermore, in the case that the device specification ID 210 is a device of company A-003, only the template ID is registered. In this case, among the devices of company A-003, only the device using the registered template ID is affected. Furthermore, in the case of a device of company A-004, the device ID and the template ID are registered. In this case, it means that only the device of the registered device ID and using the registered template ID is affected among the device of company A-004.

Moreover, the affected range may be specified by combining the range 230 and the device specification ID 210. That is, the range is specified whether there is a registration of the device specification ID 210 and each item in the range 230 or not. In this case, it means only the device having the registered items is affected regardless of the items that are not registered. For example, in the case that only the template ID is registered, it means that the entire device is affected as long as the device using the registered template ID regardless of the device specification, the device, and the software version.

Moreover, the range is configured so as to set the following classification for example without specifically registering the device ID, the software version, and the template ID as described above.

(Range 1) Applied to all of the products with a specification designated by the device specification ID210.

(Range 2) Applied only to the device ID that is designated separately among the specifications designated by the device specification ID 210.

(Range 3) Applied only to the template ID that is designated separately among the specifications designated by the device specification ID 210.

(Range 4) Applied only to the device ID that is designated separately and the template ID that is designated separately in the specification designated by the device specification ID 210.

(Range 5) Applied only to the designated template specification without affecting the designation of the device specification ID 210.

(Range 6) Applied only to the designated biometric means (for example, an authentication means utilizing a face image, etc.) without affecting the designation of the device specification ID 210. Moreover, the types of the biometric means equipped by each device are determined by the device ID as described above.

In the case that a plurality of records corresponds to each range, a correspondence with the policy of the provider side is verified for each of the plurality of records.

In the case that the range 230 is not specifically designated, a database in which difficulty and the level of an attacker are registered in every device ID and a database in which difficulty and the level of an attacker are registered in every template ID are kept in the separate vulnerability information 160. In the case that the data of the range 230 is also acquired following the device specification ID responding to a request from the service provider 130 described later, and that the range 230 is regulated to be limited to the device ID and the template ID that are designated separately, the device ID data base or the template ID database are searched separately, and difficulty and the level of an attacker corresponding to the received ID are extracted.

A condition of use of the client terminal 110 in which the vulnerability clearly exists is registered as the condition of use 240. In the present embodiment, it is classified as follows and registered for example.

(Condition 1) Under Control, that is a condition of use in which a full-time watchman exists in a space where the client terminal 110 is installed.

(Condition 2) A condition of use in which the client terminal 110 is installed in a public space and it is in an environment of mutual watch by the users.

(Condition 3) No Control that is a condition of use in which the client terminal 110 is in a private space and only the client is in control.

(Condition 4) Independent of Control, that is independent of any type of use.

As the difficulty of fraud and forgery 250, conditions are registered such as resources, whether cooperation is required or not, etc. that are necessary to realize an attack by pretending to be someone else using the vulnerability such as fraud and forgery. Specifically, for example, they are categorized using the difficulty of acquiring a capture device of the biometric information that becomes a rerequisite of the attack and whether there is cooperation or not, and are registered.

(Level 5) The capture device is not necessary, and the level of difficulty is such that the biometric information can be acquired from the template information without cooperation of a target of pretending to be someone else, for example.

(Level 4) The capture device is a general-purpose product, and the level of difficulty is such that the biometric information can be acquired without cooperation of a target of pretending to be someone else.

(Level 3) The capture device is a custom-made product, and the level of difficulty is such that the biometric information can be acquired without cooperation of a target of pretending to be someone else.

(Level 2) The capture device is a general-purpose product, and the level of difficulty is such that the biometric information can be acquired with cooperation of a target of pretending to be someone else.

(Level 1) The capture device is a custom-made product, and the level of difficulty is such that the biometric information can be acquired with cooperation of a target of pretending to be someone else.

The knowledge level of an attacker who has the ability to attack utilizing the present types of vulnerability with the present device specification has an attacker level 260. For example, the knowledge level in which the attacker to be registered must have classified as follows, and are registered.

(Level 5) Special knowledge is unnecessary.
(Level 4) Knowledge of a college graduation level.
(Level 3) Knowledge of a specialist
(Level 2) Knowledge of a level of a designer of the device specification
(Level 1) Knowledge of a level of a designer of the device specification and secret information of the person in charge of use [management] are necessary.
(Level 0) It is difficult even an attacker has both knowledge of a designer of the device specification and secret information of the person in charge of its management.

When the vulnerability verification function 152 receives a request of the vulnerability verification (vulnerability verification request) from the service provider 130, it performs the vulnerability verification by referring to the data of the vulnerability DB 160 from various information contained in the vulnerability verification request and replies with a verification result to the service provider 130 who has requested.

The vulnerability verification request contains each item recorded in the vulnerability DB 160, that is the device specification ID 210, the device ID, the software version information, and the condition of use 240 as described later. The vulnerability verification function 152 searches the vulnerability DB 160 using the device specification ID 210, the device ID, the software version information, and the condition of use 240 in the vulnerability verification request received as keys, and extracts records in which all of the records including records in which prescribed items are not registered correspond to one another. Then, it acquires the information of the types 220, the difficulty of fraud and forgery 250, and the attacker level 260 registered in the record. Then, it replies with the acquired information as a verification result to the service provider 130 who has requested. Moreover, in the case that there is no correspondence, it replies to the service provider 130 who has requested that there is no correspondence.

Moreover, the above-described explanation is one example of the vulnerability DB 160 and the vulnerability verification function 152, and for example a method of keeping the vulnerability DB 160 is not limited to this. It may have a configuration of which the vulnerability information (difficulty and level of attacking) that is kept in advance can be replied to the service provider 130 as the verification result depending on the device specification ID, the device ID, the software version information, the template ID, and the condition of use that specify the biometric authentication function 120 of the client terminal 110 in which the vulnerability verification function 152 receives from the service provider 130.

The service provider 130 is equipped with the vulnerability verification function 131, a policy verification function 132, a service providing judgment function 133, a service providing function 134, and an authentication policy 140.

The vulnerability verification function 131 requests the client terminal 110 to perform the individual authentication in the case there is a request of providing service (hereinafter referred to as a service request) from the client terminal 110. Then, when the process profile 500 is received from the client terminal 100, a vulnerability verification request is produced using the device ID 510, the device specification ID 520, the software version 530, the template information 550, and the condition of use 540 in the process profile, and is sent to the vulnerability verification server 150, and the verification result is received from the vulnerability verification server 150. Then, the vulnerability verification function 131 provides the condition of use described in the process profile 500 to the policy verification function together with the information of the type, the difficulty of fraud and forgery, and the attacking level in the verification result that is sent from the vulnerability verification server 150. Moreover, in the case of receiving a notice that there is no corresponding records from the vulnerability verification server 150, it is notified to the service providing judgment function 133.

The policy verification function 132 decides whether the vulnerability level that is specified by the items extracted from the verification result satisfies the vulnerability level of which the verification policy 140 that is kept in advance permits or not. Here, the vulnerability level is a condition of which each item registered in the vulnerability DB 160 kept by the vulnerability verification server 150 is combined.

In the case that the information extracted from the verification result satisfies the vulnerability level regulated by the authentication policy 140, the policy verification function 132 decides that the vulnerability level that the function itself permits, and notifies it and an authentication accuracy 310 (the acceptance rate of a stranger) extracted from the process profile 500 to the service providing judgment function 133. On the other hand, in the case that it is not satisfied, the policy verification function 132 ends the process at this point, and notifies that the service is impossible to the client terminal 110 that requested the service provision.

Here, the authentication policy 140 is explained. In the authentication policy 140, a combination of the authentication accuracy and the vulnerability level is registered which the biometric authentication function (biometric authentication device) 120 that performs the individual authentication at the client terminal 110 should satisfy in order for the present service provider 130 to provide a service. One example of the authentication policy 140 in the present embodiment is shown in FIG. 5.

As shown in the present drawing, the authentication accuracy 310 showing the acceptance rate of a stranger that is requested for the authentication and the vulnerability level are registered in the authentication policy 140 in the present embodiment. In the present embodiment, in the vulnerability level, a difficulty 321 showing the difficulty of fraud and forgery and the attacker level 322 showing the level of the attacker is registered as a first permissible vulnerability level 320 showing the level of the vulnerability that is permissible under control, and a difficulty 331 showing the difficulty of fraud and forgery and the attacker level 332 showing the level of the attacker is registered as a second permissible vulnerability level 330 showing the level of the vulnerability that is permissible under no control.

In the case of having a configuration of which OK or NG is returned as the collation result 560 at the client terminal 110, the authentication accuracy 310 is sent at the same time as when the authentication request is sent to the client terminal 110 as described above. In the client terminal 110 side, the present information is used during the authentication as a requested level of the acceptance rate of a stranger from the service provider 130, whether OK or NG is decided, and the collation result 560 is produced.

The policy verification function 132 decides which of the first vulnerability level 320 and the second vulnerability level 330 is confirmed depending on the condition of use received from the vulnerability verification function 131, and decides whether the difficulty and the attacker level indicating the vulnerability level received from the vulnerability verification function 131 correspond to the level stored in the authentication policy 140 or not, and notifies the result to the service providing judgment function 133.

In the present embodiment, the verification is performed specifically with the following methods.

(a) Each of the level of the difficulty of fraud and forgery and the level of an attacker is lower than the permissible level determined in advance.

(b) Either of the level of the difficulty of fraud and forgery and the level of an attacker is lower than the permissible level determined in advance.

(c) A total (or a product) of the level of the difficulty of fraud and forgery and the level of an attacker is lower than the total (or the product) of the permissible level determined in advance.

Moreover, in the present embodiment, the case is exemplified of which the above-described authentication policy 140 is set and kept for every service provider 130. However, in the case that the service provider 130 provides a plurality of services, it may be configured so that the authentication policy 140 is set and kept for every service that is provided. This is because there is a possibility that the risk changes depending on its value in every service. Further, the vulnerability level that is registered is not limited to the above-described combination. Any one of the levels may be used, and it can be set depending on the information that is kept in the vulnerability DB 160.

When the service providing judgment function 133 receives a judgment result (a notice of satisfaction) from the policy verification function 132, it extracts the collation result 560 from the process profile 500 received from the client terminal 110 where the service is requested, and it decides whether the authentication at the client terminal 110 satisfies the authentication accuracy (the acceptance rate of a stranger) 310 that is regulated in the authentication policy 140 or not. Moreover, the service providing judgment function 133 decides whether the authentication at the client terminal 110 satisfies the authentication accuracy 310 or not even in the case of receiving a notice that there is no corresponding data from the vulnerability verification function 131.

The service providing judgment function 133 decides that the corresponding client terminal 110 has authority to receive the service provision in the case that the service providing judgment function 133 is able to confirm that the client terminal 110 that sent a request is a terminal in which the authentication is possible with the authentication accuracy 310 regulated in the authentication policy 140, and it notifies the service providing function 134 about it. On the other hand, in the case that the client terminal 110 that sent an request is a terminal in which the above-described authentication cannot be performed, the service providing judgment function 133 ends the process at this point, and notifies to the client terminal 110 that providing the service is impossible.

When the service providing function 134 receives the notice from the service providing judgment function 133, it provides a service to the client terminal 110 that sent a request.

Moreover, in the case that the service provider 130 can provide a plurality of services, the information that specifies the service in which the provision is requested is notified during a request from the client terminal 110, and the service providing function 134 provides the service that is specified according to the content of the notification. Further, other functions that configure the service provider 130 perform the verification of the vulnerability, etc. to the specified services.

Detail of each device configuring the biometric authentication system with vulnerability verification function in the present embodiment is explained above. Each device is realized with a general information processing device equipped with a CPU, a memory, and a storage device. The CPU realizes each of the above-described functions by loading a program stored in a storage device to the memory and executing.

Figure 6:
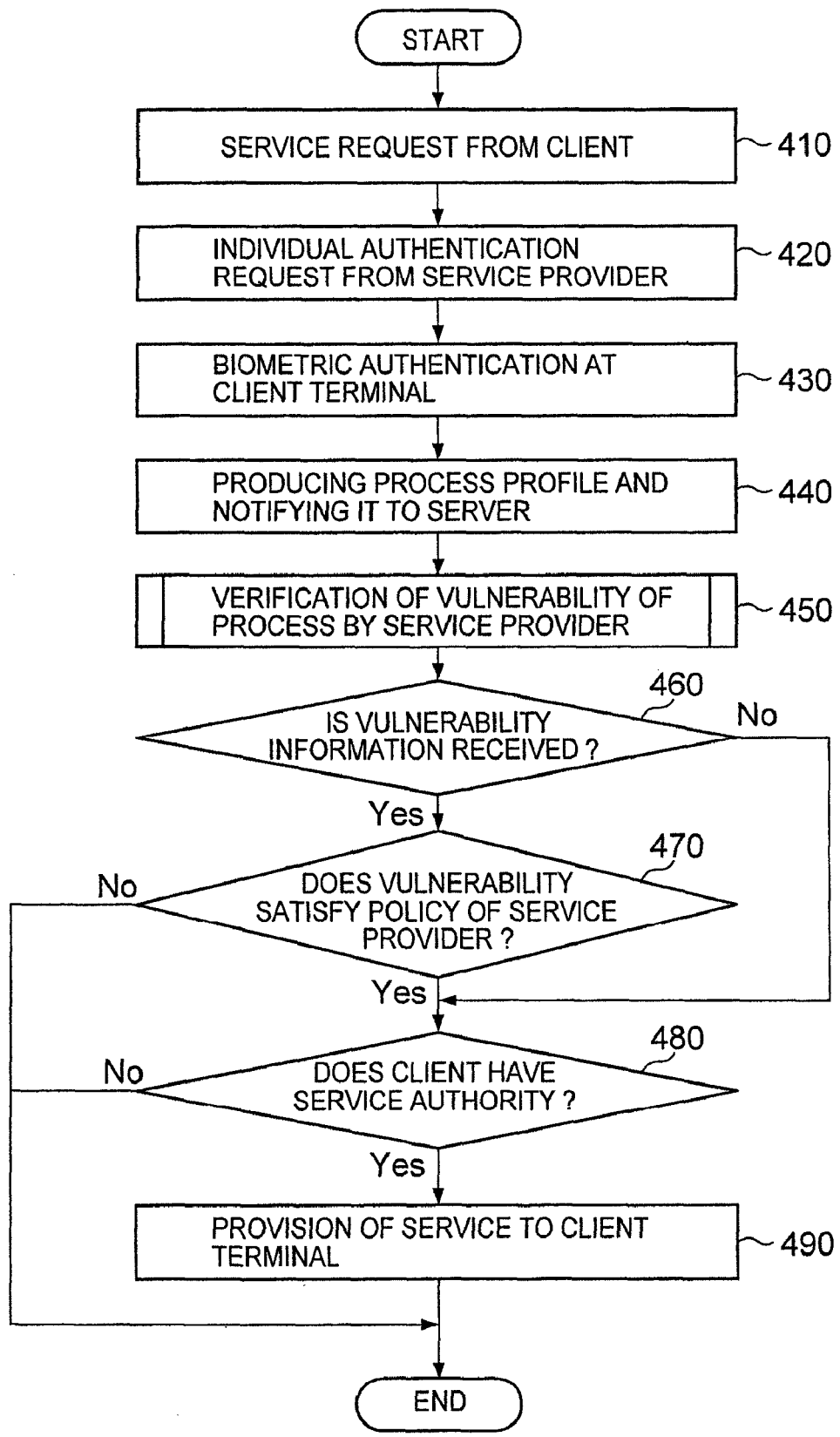
FIG. 6 is a schematic process flow of the vulnerability verification process of the entire system in the first embodiment.

Next, a summary of the vulnerability verification process from a service providing request to a provision in the biometric authentication system with vulnerability verification function in the present embodiment is explained. FIG. 6 is a schematic process flow of the vulnerability verification process of the entire system. The present process is initiated by the client terminal 110 sending a service request to the service provider 130.

The client terminal 110 sends the service request that is requesting a service provision to the service provider 130 (step 410).

The vulnerability verification function 131 of the service provider 130 sends a request of the individual authentication to the client terminal 110 where the request is sent from (step 420).

In the client terminal 110, when a request of the individual authentication is received, the biometric authentication function 120 performs the individual authentication with a biometric authentication device (step 430), the process profile producing function 112 produces the process profile 500 based on the result, and sends the process profile 500 to the service provider 130 (step 440).

The vulnerability verification function 131 of the service provider 130 performs the vulnerability verification process that verifies the vulnerability according to the received process profile 500 (step 450).

In the case of receiving the vulnerability verification result, the policy verification function 132 decides whether the client terminal 110 where the request is sent from satisfies the vulnerability level in which the service provider 130 permits or not (step 460 and step 470). In the case that it does not satisfy, the process is ended. In the case that it satisfies, the process proceeds to step 470.

Moreover, after step 450, in the case of not receiving the vulnerability verification result, the process proceeds to step 480.

Then, in the case of judging that the client terminal 110 where the request is sent from satisfies the above-described vulnerability level, the service providing judgment function 133 of the service provider 130 decides whether there is an authority to receive a service provision of the client terminal 110 from the collation result 560 in the process profile (step 480). In the case of judging that there is an authority, the process proceeds to step 490, and in the case of judging that there is no authority, the process is ended.

In the case of judging there is an authority, the service providing function 134 of the service provider 130 provides a requested service to the client terminal 110 (step 490).

Next, detail is explained about the vulnerability verification process in the above-described steps 450 and 460. The present process is initiated by the vulnerability verification function 131 of the service provider 130 receiving the process profile 500 from the client terminal 110. FIG. 7 is a process flow of the vulnerability verification process in the present embodiment.

The vulnerability verification function 131 of the service provider 130 receives the process profile 500 from the client terminal 110 (step 610), extracts the device ID 510, the device specification ID 520, the software version 530, the template information 550, and the condition of use 540 from the received process profile 500, and sends to the vulnerability verification server 150 as the vulnerability verification request (step 620).

The vulnerability verification function 152 of the vulnerability verification server 150 searches the vulnerability DB 160 using the received information as a key, and extracts the difficulty of fraud and forgery 250 and the attacker level 260 that are kept corresponding to the information (step 630). In the case that a plurality of records correspond, all of them are extracted. Moreover, in the case that the vulnerability level is set that is defined and permitted in every type of the biometrics and the vulnerability, the vulnerability verification function 152 acquires the types 220 together as well. Then, the vulnerability verification function 152 decides whether the vulnerability level of the vulnerability information that corresponds to the type of the biometrics and the vulnerability type can be permitted using the types 220 that are acquired or not.

The vulnerability verification function 152 of the vulnerability verification server 150 sends the types 220, the difficulty of fraud and forgery 250 and the attacker level 260 that are extracted to the service provider 130 (step 640).

The vulnerability verification function 131 of the service provider 130 gives the received information to the policy verification function 132. The policy verification function 132 performs the vulnerability verification by judging whether the vulnerability level received from the vulnerability verification server 150 can be permitted or not, referring to the authentication policy 140. And in the case of judging that the vulnerability level can be permitted, the policy verification function 132 sends information about it to the service providing judgment function 133 (a step 660).

Moreover, in the above-described steps 470 and 650, it was explained that the process is ended in the case that the authentication policy 140 of the service provider 130 is not satisfied. However, the process is not limited to the present method. For example, (a) The service is changed to a service having a risk that can be permitted at a vulnerability level of the biometric authentication function of the client that is verified in the case that the service provider 130 can provide a plurality of services. It can be considered to provide a version of the same service with a lower price range, etc.

(b) Other authentication means are carried out in the service provider 130 side to reduce the risk to a level of which the service that the client requests can be provided. For example, the secret information that the service requester input is accepted by contacting the service requester with some methods, etc.

As explained above, according to the present embodiment, the vulnerability level of the biometric authentication product of various types and specifications can be decided at the service provider (a provider of a service) side. Therefore, in an environment in which the biometric authentication product of various types and specifications is connected through a network and in a system providing a service after performing the individual authentication at the client terminal, a prescribed security level can be maintained, and the risk can be kept in a fixed range.

For example, the system in the present embodiments can be used in ATM, mobile banking, internet shopping, internet ticketing, electronics administrative service reservation, etc.

<<Second Embodiment>>

Next, a biometric authentication system with vulnerability verification function of the second embodiment is explained in which the present invention is applied. In the first embodiment, the vulnerability verification server 150 is equipped, and the information showing the vulnerability of a prescribed biometric authentication function is provided to the service provider 130 depending on a request from the service provider 130. However, in the system in the present embodiment, a vulnerability information server 810 is equipped instead of the vulnerability verification server 150.

Below, only configurations that differ from the first embodiment are explained. FIG. 8 is a functional configuration drawing of the vulnerability information server 810, the client terminal 110, and the service provider 130 in the present embodiment.

The vulnerability information server 810 in the present embodiment includes a vulnerability information collecting function 811, a vulnerability information providing function 812, and a vulnerability database (DB) 860.

Further, the service provider 130 in the present embodiment includes the vulnerability control function 135 and the vulnerability database (DB) 141 in addition to the functions of the service provider 130 in the first embodiment. Further, the process of the vulnerability verification function 131 differs with the above-described change in the configuration.

The vulnerability information collecting function 811 in the present embodiment collects the vulnerability information from the vulnerability evaluation function 170, the vender 180, and the template publishing organization 190 as same as the vulnerability information collecting function 151 in the first embodiment, and records in the vulnerability DB 860. However, when the vulnerability information collecting function 811 updates the vulnerability DB 860, it notifies the updated content to a vulnerability information providing function 812.

When the vulnerability information providing function 812 in the present embodiment receives the updated content of the vulnerability DB 860 from the vulnerability information collecting function 811, it sends the received information to all of the service providers 130 in the present system as the vulnerability information.

The vulnerability control function 135 of each service provider 130 controls the vulnerability DB 141 that is kept in each service provider 130 side. That is, it reflects the received vulnerability information from the vulnerability information server 810 to the vulnerability DB 141.

Further, the configuration of the vulnerability verification function 131 in the present embodiment in which the client terminal 110 is requested to perform the individual authentication in the case that there is a service request from the client terminal 110 is the same as the first embodiment. However, in the present embodiment when the vulnerability verification function 131 receives the process profile 500 from the client terminal 100, the function by itself accesses to the vulnerability DB 141 and searches records that correspond to the device ID 510, the device specification ID 520, the software version 530, the template information 550, and the condition of use 540 in the process profile 500. Then, the type and the difficulty of fraud and forgery, and the attacker level of the records is extracted and provided to the policy verification function 132. Other functional constituents and process are the same as the first embodiment.

Moreover, the vulnerability information providing function 812 provides the vulnerability information to each service provider 130 at the time when the vulnerability DB 860 is updated. However, the timing to provide is not limited to this.

For example, it may have a configuration that can be selected of sending right away depending on the degree of emergency of the vulnerability information that is provided or sending periodically as a scheduled update service. Further, the present function may be registered as a policy of the vulnerability information server 810 in advance, and it may be configured so that it is possible to select by a contract with the service provider.

The judgment of the degree of emergency of the vulnerability information is performed on the following information of the vulnerability that is newly discovered as follows.

(a) In the case that the number and the ratio (share) of the client terminal 110 corresponding to the vulnerability information is a prescribed number or more, it is decided as emergency.

(b) In the case that the number and the ratio (share) of the template that can be an attacking target as well as being the vulnerability information is a prescribed number or more, it is decided as emergency.

(c) If the ease of attacking by the vulnerability information (the ease of obtaining the information, the ease of forgery attack, and the lowness of the knowledge level of the attacker) is easier than a prescribed level, it is decided as emergency.

(d) In the case that the estimated time that is required for the attack is a prescribed time or less, it is decided as emergency.

Further, there is a case that the vulnerability information from the vulnerability information server 810 is necessarily hidden. In this case, the following means are possibly taken.

(a) The vulnerability information is hidden by carrying out a hidden communication between the vulnerability information server and the service provider with a session key after the mutual authentication by SSL, etc.

(b) A medium recorded with the information in which only the corresponding service provider 130 can be encrypted is sent by mail without sending the vulnerability information via the network.

As explained above, according to the present embodiment, the vulnerability level of the biometric authentication product of various types and specifications can be decided at the service provider (a provider of a service) side. Therefore, in an environment of which the biometric authentication product of various types and specifications is connected through a network and in a system of providing a service after performing the individual authentication at the client terminal, a prescribed security level can be maintained, and the risk can be kept in a fixed range.

In the individual authentication system with vulnerability verification in each of the above-described embodiments, the database of every index of the vulnerability on each of the biometric authentication products is kept and the verification result of the vulnerability of the corresponding biometric authentication process can be provided to a verifier (a service provider) that verifies the result of the biometric authentication based on the evaluation result of the vulnerability of each of a plurality of biometric authentication products that specifications are different.

Further, the verifier of the individual authentication system with vulnerability verification in each of the above-described embodiments has a permissible condition of each index as the authentication policy in every condition of use and can decide based on the vulnerability verification results whether the biometric authentication that is performed at the client is the authentication process that corresponds to the authentication policy for the vulnerability of the biometric authentication process.

Therefore, according to each of the above embodiments, the individual authentication according to the security policy of the verifier who verifies the biometric authentication result becomes possible for the vulnerability of the biometric authentication device. In the case that a new vulnerability is discovered, a threat level adapted to the present condition can be continuously decided by appropriately adding and updating the result in which the range of the corresponding vulnerability, the difficulty of the threat pretending to be someone else, and the level of the attacker who can use the vulnerability are evaluated, and after that the service can be provided. According to each embodiment, the risk toward the thread of pretending to be someone else can be reduced by equipping with such mechanism.

The invention claimed is:

1. A biometric authentication system that provides a service after carrying out personal identification of a service requester through a data communication network, comprising:

a client terminal that receives an input of biometric information of the service requester and performs a biometric authentication with its own biometric authentication unit using the received biometric information;

a service provider that provides a service; and a vulnerability verification server, wherein:

the client terminal is equipped with a process profile producing unit that produces a process profile, which includes specifying information that specifies the biometric authentication unit, an authentication result by the biometric authentication unit, and a condition of use indicating under what kind of security control the client terminal itself is used, and that sends the produced process profile to the service provider;

the vulnerability verification server is equipped with:

a first storage device that stores the specifying information of the biometric authentication unit, the condition of use indicating under what kind of security control the client terminal, having the biometric authentication unit, is used, and vulnerability information indicating a level of vulnerability of the biometric authentication unit specified by the specifying information and the condition of use; and a vulnerability verification unit that acquires the vulnerability information from the first storage device based on the specifying information and the condition of use included in the process profile, and sends the acquired vulnerability information to the service provider, when receiving the process profile from the service provider;

the service provider is equipped with:

a second storage device that stores an authentication policy indicating the criteria of the vulnerability information can provide the service in each plurality of vulnerability levels which is determined according to strictness of security control of the client terminal;

a vulnerability verification unit that, when receiving the process profile, sends the process profile to the vulnerability verification server, and receive the vulnerability information sent from the vulnerability verification server;

a policy verification unit that judges, based on the condition of use included in the process profile, the vulnerability level of the client terminal which sent the process profile, and further judges, based on the authentication policy, whether or not the vulnerability information sent from the vulnerability verification server satisfies the criteria at the judged vulnerability level;

a service providing judgment unit that judges, based on the judgment by the policy verification unit, whether or not the service can be provided to the client terminal which sent the process profile; and a service providing unit that provides a service to the client terminal where the request of the service was made in the case that the service providing judgment unit judges it is possible.

2. The biometric authentication system according to claim 1, wherein the vulnerability verification server comprising a vulnerability information collecting unit that collects the specifying information of the biometric authentication unit equipped in each client terminal, the condition of use of the client terminal having the biometric authentication unit, and the vulnerability information of the biometric authentication unit specified by the specifying information and the condition of use, and stores the collected specifying information, condition of use and vulnerability information.

3. The biometric authentication system according to claim 1, wherein the service providing judgment unit of the service provider comprising:

a verification policy; and the policy verification unit decides whether the vulnerability level at which the biometric authentication unit of the client terminal can provide the service is satisfied or not, by comparing the vulnerability level shown by the vulnerability information and the vulnerability level in which the service can be provided that is kept in the verification policy; and in a case of judging that the level is satisfied with the policy verification unit, the service providing judgment unit decides that the service can be provided.

4. The biometric authentication system according to claim 2, wherein:

the vulnerability information indicates difficulty of attack in each of a level of difficulty of fraud and forgery and a level of an attacker; and the service providing judgment unit judges that the service can be provided in a case that both the level of difficulty of fraud and forgery and the level of the attacker of the vulnerability information received by the policy verification unit, satisfy the criteria of the authentication policy.

5. The biometric authentication system according to claim 3, wherein:

the service provider can provide a plurality of services;

the service providing judgment unit judges whether there is an service of the plurality of services, that can be provided within the vulnerability level of the vulnerability information or not among other services in a case of judging that the service that is requested to be provided from the client terminal cannot be provided; and the service providing unit provides the any service that was judged to be capable by the service providing judgment unit to the client terminal where the request was made.

6. The biometric authentication system according to claim 4, wherein:

the process profile includes the condition of use in addition to the information that specifies the biometric authentication unit; and the condition of use is also kept in the vulnerability information keeping unit in addition to the information that specifies the biometric authentication unit.

7. A biometric authentication system that provides a service after carrying out personal identification of a service requester through a data communication network and that is equipped with:

a client terminal that receives an input of biometric information of the service requester and performs a biometric authentication with its own biometric authentication unit using the received biometric information, a service provider that provides a service, and a vulnerability verification server, wherein:

the client terminal is equipped with a process profile producing unit that produces a process profile, which includes specifying information that specifies the biometric authentication unit, an authentication result by the biometric authentication unit, and a condition of use indicating under what kind of security control the client terminal itself is used, and that sends a produced process profile to the service provider;

the vulnerability verification server is equipped with:

a first storage device that stores the specifying information of the biometric authentication unit, the condition of use indicating under what kind of security control the client terminal, having the biometric authentication unit, is used, and the vulnerability information indicating the level of vulnerability of the biometric authentication unit specified by the specifying information and the condition of use; and a change notifying unit that sends, when information stored in the first storage device is updated, updated information to the service provider;

the service provider is equipped with:

a second storage device that stores an authentication policy indicating criteria of the vulnerability information which can provide the service in each plurality of vulnerability levels which is determined according to strictness of security control of the client terminal;

a third storage device that stores the specifying information of the biometric authentication unit, the condition of use indicating under what kind of security control the client terminal, having the biometric authentication unit, is used, and the vulnerability information indicating the level of vulnerability of the biometric authentication unit specified by the specifying information and the condition of use; and a vulnerability information management unit that causes the third storage device to store the updated information when receiving the updated information from the vulnerability verification server;

a vulnerability verification unit that acquires based on the specifying information and the condition of use included in the process profile, when receiving the process profile, the vulnerability information sent from the third storage device;

a policy verification unit that judges, based on the condition of use included in the process profile, the vulnerability level of the client terminal which sent the process profile, and further judges, based on the authentication policy, whether or not the acquired vulnerability information satisfies the criteria at the judged vulnerability level;

a service providing judgment unit that judges, based on the judgment by the policy verification unit, whether or not the service can be provided to the client terminal which sent the process profile; and a service providing unit that provides a service to the client terminal where the request of the service was made in a case that the service providing judgment unit judges it is possible.

8. The biometric authentication system according to claim 7 further comprising:

a vulnerability information collecting unit that collects the vulnerability information of the biometric authentication unit equipped in each client terminal, the condition of use of the client terminal having the biometric authentication unit, and the acquired vulnerability information under the condition of use and stores the collected specifying information, condition of use, and vulnerability information.

9. The biometric authentication system according to claim 8, wherein;

the first storage device stores the specifying information of the biometric authentication unit, types of the vulnerability of the client terminal having the biometric authentication unit, a range affected by the vulnerability, and the condition of use of the client terminal in which the vulnerability clearly exists; and the vulnerability information includes a resource and condition that are necessary to realize an attack using the vulnerability, and a knowledge level of an attacker having an ability of attacking using the vulnerability, which are registered in a vulnerability information keeping unit as the vulnerability information.

10. The biometric authentication system according to claim 9, wherein the range affected by the vulnerability is specified by the information that specifies the device of the biometric authentication unit, the information that specifies the software, and the information that specifies the template.

11. A service providing propriety judging method implemented via a biometric authentication system that provides a service after carrying out personal identification of a service requester through a data communication network, wherein:

the biometric authentication system is equipped with a client terminal, a vulnerability verification server, and a service provider, and:

the client terminal is equipped with a process profile producing unit that produces a process profile, which includes specifying information that specifies a biometric authentication unit, an authentication result by the biometric authentication unit, and a condition of use indicating under what kind of security control the client terminal itself is used, and that sends a produced process profile to the service provider;

the vulnerability verification server is equipped with a first storage device that stores the specifying information of the biometric authentication unit, the condition of use indicating under what kind of security control the client terminal, having the biometric authentication unit, is used, and vulnerability information indicating a level of vulnerability of the biometric authentication unit specified by the specifying information and the condition of use; and the service provider is equipped with a second storage device that stores an authentication policy indicating criteria of the vulnerability information which can provide the service in each plurality of vulnerability levels which is determined according to strictness of security control of the client terminal; and the service provider executes sending, when receiving the process profile, the process profile to the vulnerability verification server;

the vulnerability verification server executes acquiring, based on the specifying information and the condition of use included in the process profile, when receiving the process profile from the service provider, the vulnerability information from the first storage device and sending acquired vulnerability information to the service provider; and the service provider executes:

receiving the vulnerability information send from the vulnerability verification server;

judging, based on the condition of use included in the process profile, a vulnerability level of the client terminal which sent the process profile, and further judges, based on the authentication policy, whether or not the vulnerability information sent from the vulnerability verification server satisfies a criteria at a judged vulnerability level;

judging, based on the judgment by a policy verification unit, whether or not the service can be provided to the client terminal which sent the process profile; and providing a service to the client terminal in a case that a service providing judgment unit judges providing the service is possible.

12. A non-transitory computer-readable medium embodying a program for running a computer of a service provider in a biometric authentication system that provides a service after carrying out personal identification of a service requester through a data communication network comprising:

a client terminal that receives an input of biometric information of the service requester and performs a biometric authentication with its own biometric authentication unit using the received biometric information;

a service provider that provides a service; and a vulnerability verification server;

wherein:

the client terminal is equipped with a process profile producing unit that produces a process profile, which includes specifying information that specifies the biometric authentication unit, an authentication result by the biometric authentication unit, and a condition of use indicating under what kind of security control the client terminal itself is used, and that sends a produced process profile to the service provider;

the vulnerability verification server is equipped with:

a first processor;

a first storage device that stores the specifying information of the biometric authentication unit, the condition of use indicating under what kind of security control the client terminal, having the biometric authentication unit, is used, and vulnerability information indicating a level of vulnerability of the biometric authentication unit specified by the specifying information and the condition of use; and the service provider is equipped with:

a second processor;

a second storage device that stores an authentication policy indicating criteria of the vulnerability information which can provide the service in each plurality of vulnerability levels which is determined according to strictness of security control of the client terminal;

wherein the program, when executed, causes:

the first processor of the vulnerability verification server to function as a vulnerability verification unit that acquires the vulnerability information from the first storage device based on the specifying information and the condition of use included in the process profile, and sends acquired vulnerability information to the service provider, when receiving the process profile from the service provider;

the second processor of the service provider to function as:

a second vulnerability verification unit that, when receiving the process profile, sends the process profile to the vulnerability verification server, and receive the vulnerability information sent from the vulnerability verification server;

a policy verification unit that judges, based on the condition of use included in the process profile, a vulnerability level of the client terminal which sent the process profile, and further judges, based on the authentication policy, whether or not the vulnerability information sent from the vulnerability verification server satisfies criteria at the judged vulnerability level;

a service providing judgment unit that judges, based on the judgment by the policy verification unit, whether or not the service can be provided to the client terminal which sent the process profile; and a service providing unit that provides the service to the client terminal where the request of the service was made in a case that the service providing judgment unit judges that providing the service is possible.

13. A vulnerability verification server that notifies vulnerability information indicating the vulnerability level of the biometric authentication unit of a client depending on a request from a service provider providing a service in a biometric authentication system that provides the service after carrying out personal identification of a service requester through a data communication network;

wherein:

a client terminal is equipped with a process profile producing unit that produces a process profile, which includes specifying information that specifies a biometric authentication unit, an authentication result by the biometric authentication unit, and a condition of use indicating under what kind of security control the client terminal itself is used, and that sends a produced process profile to the service provide;

the service provider is equipped with:

a storage device that stores an authentication policy indicating criteria of the vulnerability information which can provide the service in each plurality of vulnerability levels which is determined according to strictness of security control of the client terminal:

a vulnerability verification unit that, when receiving the process profile, sends the process profile to the vulnerability verification server, and receives the vulnerability information sent from the vulnerability verification server;

a policy verification unit that judges, based on the condition of use included in the process profile, a vulnerability level of the client terminal which sent the process profile, and further judges, based on the authentication policy, whether or not the vulnerability information sent from the vulnerability verification server satisfies criteria at a judged vulnerability level;

a service providing judgment unit that judges, based on judgment by the policy verification unit, whether or not the service can be provided to the client terminal which sent the process profile; and a service providing unit that provides the service to the client terminal where the request of the service was made in a case that the service providing judgment unit judges that providing the service is possible;

the vulnerability verification server is equipped with:

another storage device that stores the specifying information of the biometric authentication unit, the condition of use indicating under what kind of security control the client terminal, having the biometric authentication unit, is used, and the vulnerability information indicating the level of vulnerability of the biometric authentication unit specified by the specifying information and the condition of use; and a vulnerability verification unit that acquires the vulnerability information from the first storage device based on the specifying information and the condition of use included in the process profile, and sends the acquired vulnerability information to the service provider, when receiving the process profile from the service provider.

* * * * *